(12) United States Patent
Damola et al.

(10) Patent No.: US 9,813,195 B2
(45) Date of Patent: Nov. 7, 2017

(54) TRANSMITTING AND A RECEIVING DEVICE AND RESPECTIVE METHODS PERFORMED THEREBY FOR IMPROVING RETRANSMISSIONS IN WIRELESS NETWORKS

(71) Applicant: TELEFONAKTIEBOLAGET L M ERICSSON (PUBL), Stockholm (SE)

(72) Inventors: Ayodele Damola, Solna (SE); Bo Zhang, Solna (SE)

(73) Assignee: TELEFONAKTLEBOLAGET LM ERICSSON (PUBL), Stockholm (SE)

( * ) Notice: Subject to any disclaimer, the term of this patent is extended or adjusted under 35 U.S.C. 154(b) by 187 days.

(21) Appl. No.: 14/652,885

(22) PCT Filed: Dec. 3, 2013

(86) PCT No.: PCT/SE2013/051434
§ 371 (c)(1),
(2) Date: Jun. 17, 2015

(87) PCT Pub. No.: WO2014/098720
PCT Pub. Date: Jun. 26, 2014

(65) Prior Publication Data
US 2015/0333874 A1    Nov. 19, 2015

Related U.S. Application Data

(60) Provisional application No. 61/738,459, filed on Dec. 18, 2012.

(51) Int. Cl.
*H04L 1/18* (2006.01)
*H04W 76/00* (2009.01)
(Continued)

(52) U.S. Cl.
CPC .......... *H04L 1/1809* (2013.01); *H04L 1/0076* (2013.01); *H04L 1/1845* (2013.01);
(Continued)

(58) Field of Classification Search
CPC ... H04L 1/1809; H04L 1/0076; H04L 1/1845; H04L 2001/0093; H04W 76/002; H04W 84/042
See application file for complete search history.

(56) References Cited

U.S. PATENT DOCUMENTS

2007/0274324 A1    11/2007  Wu
2010/0146355 A1*   6/2010   Jiang ..................... H04L 1/1671
                                                            714/749

(Continued)

OTHER PUBLICATIONS

Katti, S., et al., "XORs in the Air: Practical Wireless Network Coding;" Proceedings of ACM SIGCOMM; Sep. 11, 2006.
(Continued)

*Primary Examiner* — Thai Nguyen

(57) ABSTRACT

A wireless receiving device and a method for receiving a transmission from a transmitting device following a broadcast transmission of a plurality of packets are provided. During the broadcast transmission, packets successfully received have been acknowledged and stored in a memory associated with the receiving device and unsuccessfully received packets have been negatively acknowledged. The method comprises receiving a retransmission of a packet from the transmitting device and sending, to the transmitting device, an acknowledge, ACK, message with respect to the received retransmitted packet. The method further comprises decoding the received retransmitted packet using stored previously successfully decoded packets, wherein if the received retransmitted packet is successfully decoded then the method comprises decoding stored previously partially decoded packets using the successfully decoded packet. The method also comprises storing the successfully decoded packet and/or the partially decoded packet.

14 Claims, 14 Drawing Sheets

(51) Int. Cl.
*H04L 1/00* (2006.01)
*H04W 84/04* (2009.01)
(52) U.S. Cl.
CPC ... H04W 76/002 (2013.01); *H04L 2001/0093* (2013.01); *H04W 84/042* (2013.01)

(56) References Cited

U.S. PATENT DOCUMENTS

2012/0314655 A1    12/2012    Xue
2016/0006676 A1*   1/2016     Haeupler ............... H04L 49/90
                                                            370/412

OTHER PUBLICATIONS

H. Xi, X. Wang, Y. Zhao, and H. Zhang, "A reliable broadcast transmission approach based on random linear network coding," in Vehicular Technology Conference (VTC Spring), 2012 IEEE 75th, pp. 1-5, May 2012.

X. Xiao, Y. Lu-Ming, W. Wei-Ping, and Z. Shuai, "A wireless broadcasting retransmission approach based on network coding," in Circuits and Systems for Communications, 2008. ICCSC 2008. 4th IEEE International Conference on, pp. 782-786, May 2008.

L. Xuanmin, W. Xingliang, F. Sha, and L. Yaliang, "A new wireless broadcasting retransmission algorithm based on multiple nodes network coding technology," in Wireless Communications, Networking and Mobile Computing (WiCOM), 2011 7th International Conference on, pp. 1-4, Sep. 2011.

W. Fang, F. Liu, Z. Liu, L. Shu, and S. Nishio, "Reliable broadcast transmission in wireless networks based on network coding," in Computer Communications Workshops (INFOCOM WKSHPS), 2011 IEEE Conference on, pp. 555-559, Apr. 2011.

L. Lu, M. Xiao, M. Skoglund, L. Rasmussen, G. Wu, and S. Li, "Efficient network coding for wireless broadcasting," in Wireless Communications and Networking Conference (WCNC), 2010 IEEE, pp. 1-6, Apr. 2010.

L. Gou, G. xin Zhang, W. Sun, and D. ming Bian, "Wbrbnc: A wireless broadcast retransmission approach using binary network coding," in Measurement, Information and Control (MIC), 2012 International Conference on, vol. 2, pp. 944-948, May 2012.

* cited by examiner

Fig. 7

TRANSMITTING AND A RECEIVING DEVICE AND RESPECTIVE METHODS PERFORMED THEREBY FOR IMPROVING RETRANSMISSIONS IN WIRELESS NETWORKS

This application is a 371 of PCT/SE2013/051434, filed Dec. 3, 2013, which claims the benefit of U.S. Provisional Application No. 61/738,459, filed Dec. 18, 2012, the disclosures of which are fully incorporated herein by reference.

TECHNICAL FIELD

The present disclosure relates generally to a method and an apparatus for improving the efficiency of retransmission in a broadcast wireless networks using network coding.

BACKGROUND

Network coding is a technique which is normally used to improve a network's throughput, efficiency and scalability by simultaneously transmitting the same information to multiple receivers in the network, i.e. in a wireless broadcast system or multicast system.

In a wireless broadcast and multicast systems, the transmitter or sender which may be a Radio Base Station (RBS), also referred to as "eNodeB" or BTS (Base Transceiver Station) broadcasts data to multiple receivers, which may be User Equipments (UEs) also referred to as mobile stations, mobile terminals, wireless terminals, mobile telephones, cellular telephones or smartphones, laptops, notebooks, tablets, handheld devices via a broadcast channel simultaneously. Sometimes, not all the packets arrive at their destination and some of them are lost during the transmission phase. For each packet received, each receiver sends an acknowledgement (ACK) message confirming the reception and sends a non-acknowledgement (NACK) message for each lost packet. In order to replace the lost packets, the transmitter may have the choice to either retransmit all the packets that were lost during the transmission (Automatic Repeat reQuest, ARQ, retransmission) or to retransmit only a pre-defined number of packets using network coding.

In network coding, the transmitter encodes several packets together. This may be used for attaining the maximum possible information flow in a network.

As shown in FIG. 1, a transmitter is broadcasting P1 and P2 to User Equipment 1 (UE1) and User Equipment 2 (UE2). Moreover, P1 is lost by UE1 and P2 is lost by UE2. In FIG. 1a, the ARQ-retransmission is shown here, which involves resending the packets P1 and P2 to the receivers.

In FIG. 1b, it is shown a retransmission using network coding. Here, the packets P1 and P2 are combined using a logical operation called 'exclusive or' or also referred as XOR, denoted as $\oplus$. The UEs recover the lost packets performing the following XOR operations:

UE1 recovers P2: $P1 \oplus .(P1 \oplus .P2)$
UE2 recovers P1: $P2 \oplus .(P1 \oplus .P2)$ As seen in this example, the retransmission in 1b required retransmitting only one packet instead of two packets separately as performed by ARQ-retransmission in 1a.

In general, there are a few existing technologies used to retransmit packets in a broadcast or multicast system. As mentioned above, ARQ-retransmission is one of them, where all blocks are retransmitted if any of the receivers loses a packet. Then, we have the network coding schemes which may be either randomly or binary. The Random Linear Network Coding (RLNC) retransmits the lost packets by encoding all packets with a randomly selected coefficient. If k packets are lost during the transmission phase, the receiver recovers the lost packets by k retransmissions. The decoding procedure involves resolving a k-linear equation. The Binary network coding schemes involve encoding several of the lost packets in binary form using the XOR-operation. The advantage of using the XOR-operation is that there is no need to use any other operation for decoding the retransmitted packets, and the calculations are much simpler than for the RLNC.

Among the binary network coding schemes, there are a few to be mentioned here:

NCWBR (Network Coding in Wireless Broadcast Retransmission) is a method of encoding every receiver's first lost packet in the retransmission phase.

VCHA (Vertex Colouring-based Heuristic Algorithm) is a binary network coding scheme that uses vertex colouring method.

Bucket uses the known bucket theory.

WBRBNC (Wireless Broadcast Retransmission approach based on Binary Network Coding) is a binary network coding scheme which uses a greedy method in the encoded packet selection.

Despite the number of retransmission methods used, there are still problems that are not solved by these coding schemes. For instance, the traditional retransmission scheme ARQ is not efficient due to a large amount of retransmission data is resent when a large number of packets are lost for many receivers. In contrary, the RLNC achieves a high level of efficiency when retransmitting. However, RLNC decodes packets in a complex way. The average decoding complexity per retransmission packet is $O(n^2)$. In general, when the number of retransmissions is large due to its complexity, it is then not feasible to decode the packets in a reasonable time to fit the real time requirement. Furthermore, it becomes less feasible to be implemented in lower network layer protocols compared to binary schemes.

SUMMARY

The object is to obviate at least some of the problems outlined above. In particular, it is an object to provide a wireless receiving device and a method performed thereby for receiving a transmission from a transmitting device following a broadcast transmission of a plurality of packets from the transmitting device. It is a further object to provide a wireless transmitting device and a method performed thereby for performing a broadcast transmission of a plurality of packets to receiving devices. These objects and others may be obtained by providing a wireless receiving device and a wireless transmitting device respectively and a respective method performed by the wireless receiving device and a wireless transmitting device respectively according to the independent claims attached below.

According to an aspect a method performed by a wireless receiving device for receiving a transmission from a wireless transmitting device following a broadcast transmission of a plurality of packets from the wireless transmitting device is provided. During the previously broadcast transmission, packets successfully received during the broadcast transmission have been acknowledged to the transmitting device and stored in a memory associated with the receiving device and unsuccessfully received packets have been negatively acknowledged to the transmitting device. The method comprises receiving a retransmission of a packet from the transmitting device and sending, to the transmitting device, an acknowledge, ACK, message with respect to the received retransmitted packet. The method further comprises decoding the received retransmitted packet using stored previously successfully decoded packets, wherein if the received retransmitted packet is successfully decoded then the method comprises decoding 340 stored previously partially decoded packets using the successfully decoded packet. The method also comprises storing the successfully decoded packet and/or the partially decoded packet.

According to an aspect, method performed a wireless transmitting device for performing a broadcast transmission of a plurality of packets to receiving devices is provided. The method comprises transmitting the broadcast transmission of the plurality of packets to the receiving devices; receiving acknowledge, ACK, messages and negative acknowledge, NACK, message(s) for the transmitted plurality of packets from the receiving devices, and storing the ACK or NACK information for each packet with regard to the receiving devices. The method further comprises determining a first set of packets to be retransmitted based on the stored ACK or NACK information for each packet, wherein the first set comprises at least one previously negatively acknowledged packet, or a combination of at least one previously acknowledged packet and at least one previously negatively acknowledged packet. The method also comprises combining the first set of packets into one first packet, and transmitting the first packet to the receiving devices.

According to yet an aspect, a wireless receiving device adapted for receiving a transmission from a transmitting device following a broadcast transmission of a plurality of packets from the transmitting device is provided. During the broadcast transmission, packets successfully received have been acknowledged to the transmitting device and stored in a memory associated with the receiving device and unsuccessfully received packets have been negatively acknowledged to the transmitting device. The wireless receiving device comprises a processor and a memory. The memory comprises instructions which when executed by the processor causes the wireless receiving device to receive a retransmission of a packet from the transmitting device; and to decode the received retransmitted packet using stored previously successfully decoded packets, wherein if the received retransmitted packet is successfully decoded then decode stored previously partially decoded packets using the successfully decoded packet. The instructions in the memory which when executed by the processor further causes the wireless receiving device to store the successfully decoded packet and/or the partially decoded packet; and to send, to the transmitting device, an acknowledge, ACK, message with respect to the received retransmitted packet.

According to still an aspect, a wireless receiving device adapted for receiving a transmission from a transmitting device is provided. The wireless transmitting device comprises a processor and a memory, the memory comprising instructions which when executed by the processor causes the wireless transmitting device to transmit the broadcast transmission of the plurality of packets to the receiving devices; receive acknowledge, ACK, messages and negative acknowledge, NACK, message(s) for the transmitted plurality of packets from the receiving devices; and to store the ACK or NACK information for each packet with regard to the receiving devices. The memory further comprises instructions which when executed by the processor causes the wireless transmitting device to determine a first set of packets to be retransmitted based on the stored ACK or NACK information for each packet, wherein the first set comprises at least one previously negatively acknowledged packet, or a combination of at least one previously acknowledged packet and at least one previously negatively acknowledged packet; to combine the first set of packets into one first packet; and to transmit the first packet to the receiving devices.

According to another aspect, a wireless receiving device for receiving a transmission from a transmitting device is provided. During the broadcast transmission, packets successfully received have been acknowledged to the transmitting device and stored in a memory associated with the receiving device and unsuccessfully received packets have been negatively acknowledged to the transmitting device. The wireless receiving device comprises a receiving unit for receiving a retransmission of a packet from the transmitting device; and a decoding unit for decoding the received retransmitted packet using stored previously successfully decoded packets, and for decoding stored previously partially decoded packets using the successfully decoded packet if the received retransmitted packet is successfully decoded. The wireless receiving device further comprises a storing unit for storing the successfully decoded packet and/or the partially decoded packet; and a sending unit for sending, to the transmitting device, an acknowledge, ACK, message with respect to the received retransmitted packet.

According to yet another aspect, a wireless transmitting device for performing a broadcast transmission of a plurality of packets to receiving devices is provided. The wireless transmitting device comprises a transmitting unit for transmitting the broadcast transmission of the plurality of packets to the receiving devices; a receiving unit for receiving acknowledge, ACK, messages and negative acknowledge, NACK, message(s) for the transmitted plurality of packets from the receiving devices; and a storing unit for storing the ACK or NACK information for each packet with regard to the receiving devices. The wireless transmitting device further comprises a determining unit for determining a first set of packets to be retransmitted based on the stored ACK or NACK information for each packet, wherein the first set comprises at least one previously negatively acknowledged packet, or a combination of at least one previously acknowledged packet and at least one previously negatively acknowledged packet; and a combining unit for combining the first set of packets into one first packet; wherein the transmitting unit also is for transmitting the first packet to the receiving devices.

The method performed by the wireless receiving device, the method performed by the wireless transmitting device and the wireless receiving device and the wireless transmitting device respectively may have several advantages. One possible advantage is that it may reduce amount of data sent over the wireless link and thereby may increase the throughput of the system. Another possible advantage is that the retransmission is made more efficient performing closely as efficient as RLNC, which is a theoretical base line.

BRIEF DESCRIPTION OF DRAWINGS

Embodiments will now be described in more detail in relation to the accompanying drawings, in which:

FIG. 7 is a presentation of the status of a packet matrix according to the specific example described in FIG. 6.

DETAILED DESCRIPTION

Briefly described, a wireless receiving device and a wireless transmitting device and respective methods performed thereby for transmitting packets from the transmitting to the wireless receiving device following a broadcast transmission of a plurality of packets. In other words, methods and apparatuses are provided for retransmitting lost packets, e.g. based on binary network coding, by storing retransmitted packets that cannot be fully decoded by the decoding logic (partially decoded or partially-complete packets) and by using those in the decoding process with subsequently received retransmission packets. This proposed method and apparatus will allow reducing the amount of retransmitted data over a wireless link and thereby will increase the total throughput of a broadcast or multicast system. Furthermore, the method described hereby may be applied on any network layer (L2 to L7) from data link to any type of application such as Internet Protocol Television (IPTV), Content Delivery Network (CDN) and any mobile application.

Other binary network coding solutions do not store the partially decoded packets for future use as the present method. Instead, they may either drop the partially decoded packets (such as NCWBR) or simply skip sending them (such as VCHA, WBRBNC). Moreover, the average complexity for decoding one single packet is O(1), which is much lower compared to e.g. the RLNC which complexity is $O(n^2)$.

Figure 3A:
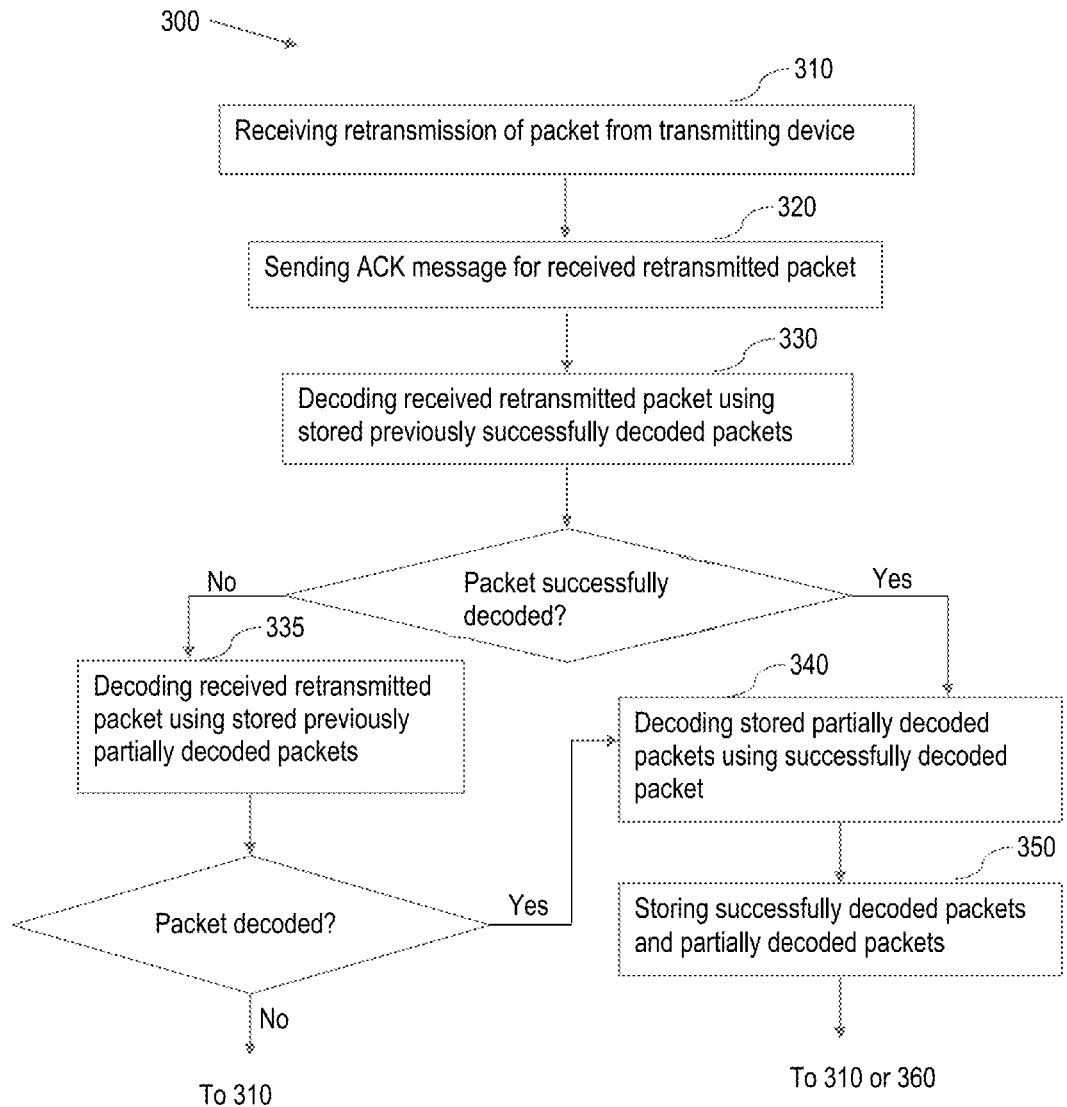
FIG. 3a is a flowchart of a method performed by a wireless receiving device for receiving a transmission from a transmitting device according to an exemplifying embodiment.
Figure 3B:
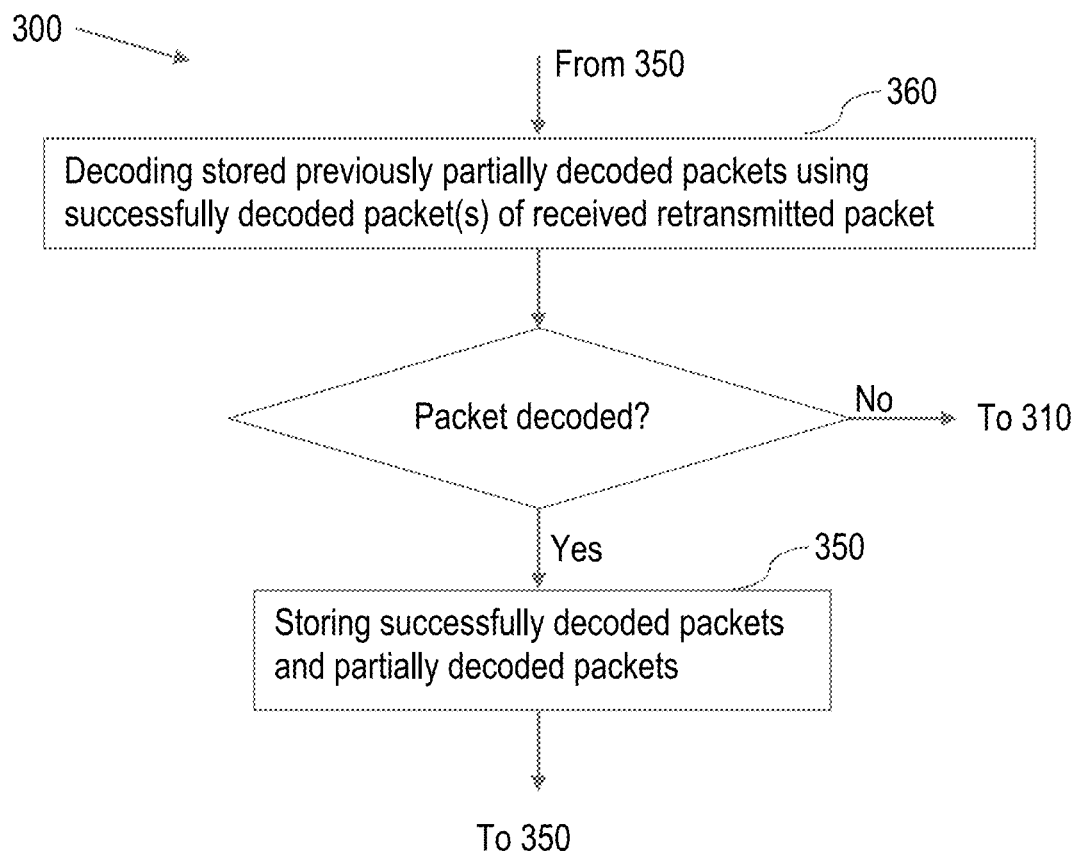
FIG. 3b is a flowchart of a method performed by a wireless receiving device for receiving a transmission from a transmitting device according to still an exemplifying embodiment.

Exemplifying embodiments of a method performed by a wireless receiving device will now be described with reference to FIGS. 3a and 3b. FIGS. 3a and 3b illustrate different exemplifying embodiments of the method performed by the receiving device for receiving a transmission from a wireless transmitting device following a broadcast transmission of a plurality of packets from the wireless transmitting device. During the previously broadcast transmission, packets successfully received during the broadcast transmission have been acknowledged to the transmitting device and stored in a memory associated with the receiving device and unsuccessfully received packets have been negatively acknowledged to the transmitting device. FIG. 3a illustrates the method comprising receiving 310 a retransmission of a packet from the transmitting device and sending 320, to the transmitting device, an acknowledge, ACK, message with respect to the received retransmitted packet. The method further comprises decoding 330 the received retransmitted packet using stored previously successfully decoded packets, wherein if the received retransmitted packet is successfully decoded then the method comprises decoding 340 stored previously partially decoded packets using the successfully decoded packet. The method also comprises storing 350 the successfully decoded packet and/or the partially decoded packet.

During the broadcast session preceding the transmission of packets described above, the wireless receiving device positively acknowledges, ACKs, successfully received packets and negatively acknowledges, NACKs, unsuccessfully received packets. This informs the transmitting device which packets it needs to retransmit after the broadcast session. There may be several wireless receivers sending ACKs and NACKs which are all received by the transmitting device, which will be explained in more detail below.

The method can be said to take place during a re-transmission phase, or the method can be said to be part of a re-transmission phase. The transmitting device retransmits a packet to the receiving device. This retransmitted packet is received 310 by the wireless receiving device. The wireless receiving device decodes 330 the retransmitted packet using stored previously successfully received packets. The decoding of the received packet using previously successfully received packets may be e.g. performing an exclusive-or, XOR, operation on the received retransmitted packet and at least one of the stored previously successfully received packets.

If the received retransmitted packet is successfully decoded then the method comprises decoding 340 stored previously partially decoded packets using the successfully decoded packet. If the received retransmitted packet is only partially decoded using previously successfully received packets, then the partially decoded packet is stored, e.g. in a memory in the wireless receiving device. Thus, after a first retransmission of a first packet, the wireless receiving device may have stored successfully received packets, and partially decoded packets. For the very first retransmission, there is no partially decoded packet. But after the first retransmission of the first packet, there may be at least one partially decoded packets which is stored, e.g. in a memory of the wireless receiving device.

The method also comprises storing the successfully decoded packet as a successfully received packet.

The method performed by the wireless receiving device may have several advantages. One possible advantage is that it may reduce amount of data sent over the wireless link and thereby may increase the throughput of the system. Another possible advantage is that the retransmission is made more efficient performing closely as efficient as RLNC, which is a theoretical base line.

The received retransmitted packet received by the retransmission may comprise at least one previously negatively acknowledged packet, or a combination of at least one previously acknowledged packet and at least one previously negatively acknowledged packet.

It may be that only one packet has been lost, i.e. not being successfully received, and in such a case only that packet needs to be transmitted. However, since the broadcast may both comprise a vast plurality of packets and the broadcast may be received by a plurality of individual wireless receiving devices experiencing individual radio link conditions, possible several packets may be lost and in need of being retransmitted. Thus, the retransmitted packet may comprise at least one previously acknowledged packet and at least one previously negatively acknowledged packet. If the wireless receiving device receives a retransmitted packet comprising a combination of a previously successfully received packet and a previously unsuccessfully received packet, the wireless receiving device may decode the previously unsuccessfully received packet of the retransmitted packet using the previously successfully received packet.

Looking at FIG. 3b, the method may further comprise, if an at least one previously negatively acknowledged packet comprised in the received retransmitted packet was successfully decoded, decoding 360 stored previously partially decoded packets using the successfully received packet(s) of the received retransmitted packet.

Assume the wireless receiving device has stored some previously successfully received packets and some partially decoded packets. If the wireless receiving device then successfully decodes a previously negatively acknowledged packet comprised in the received retransmitted packet, then the wireless receiving device may use this successfully decoded packet and attempt to decode other stored partially decoded packets. All packets that are successfully decoded are stored as successfully received packets. In this manner, a single retransmitted packet may be used to decode several previously partially decoded packets stored in the wireless receiving device. As soon as a previously partially decoded packet is successfully decoded, it may be used to decode other stored partially decoded packets.

The method may further comprise, if a stored previously partially decoded packet is successfully decoded using the successfully decoded packet(s) of the received retransmitted packet, decoding 360 anew stored previously partially decoded packets using the most recently successfully decoded packet.

In other words, as explained above, as soon as a previously partially decoded packet is successfully decoded, it may be used to decode other stored partially decoded packets.

Figure 4A:
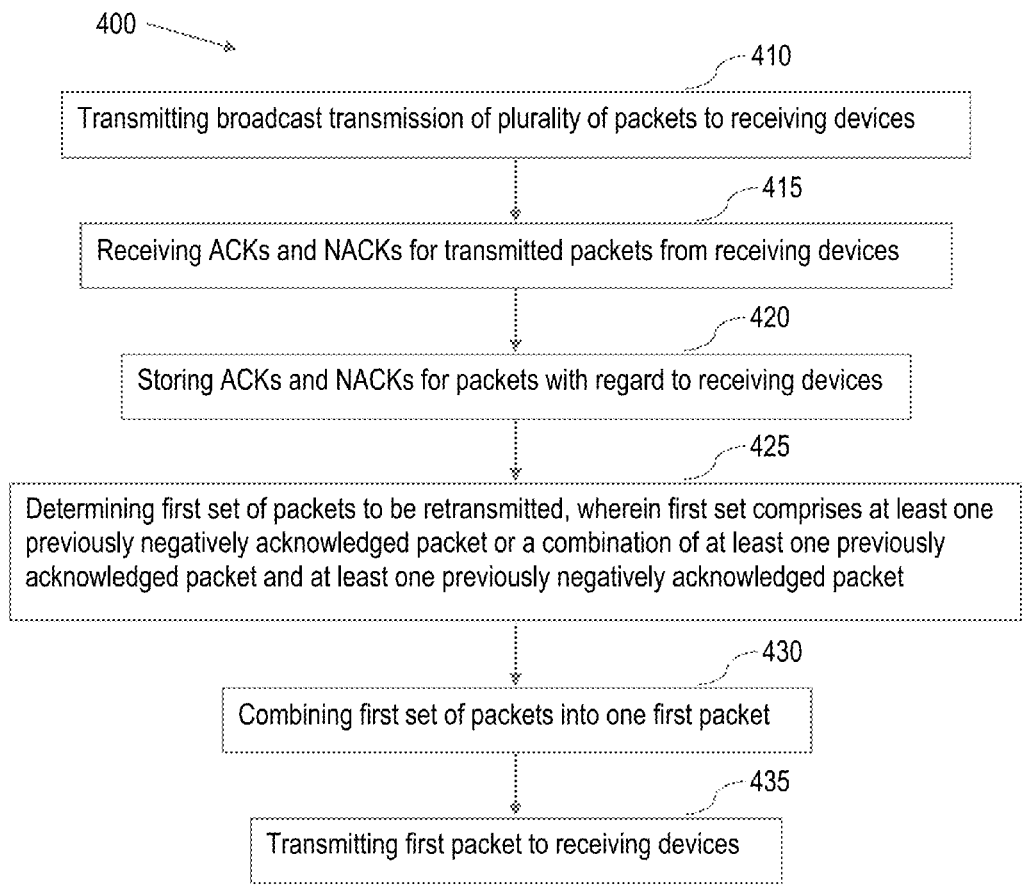
FIG. 4a is a flowchart of a method performed by a wireless transmitting device for performing a broadcast transmission from a transmitting device according to an exemplifying embodiment.
Figure 4B:
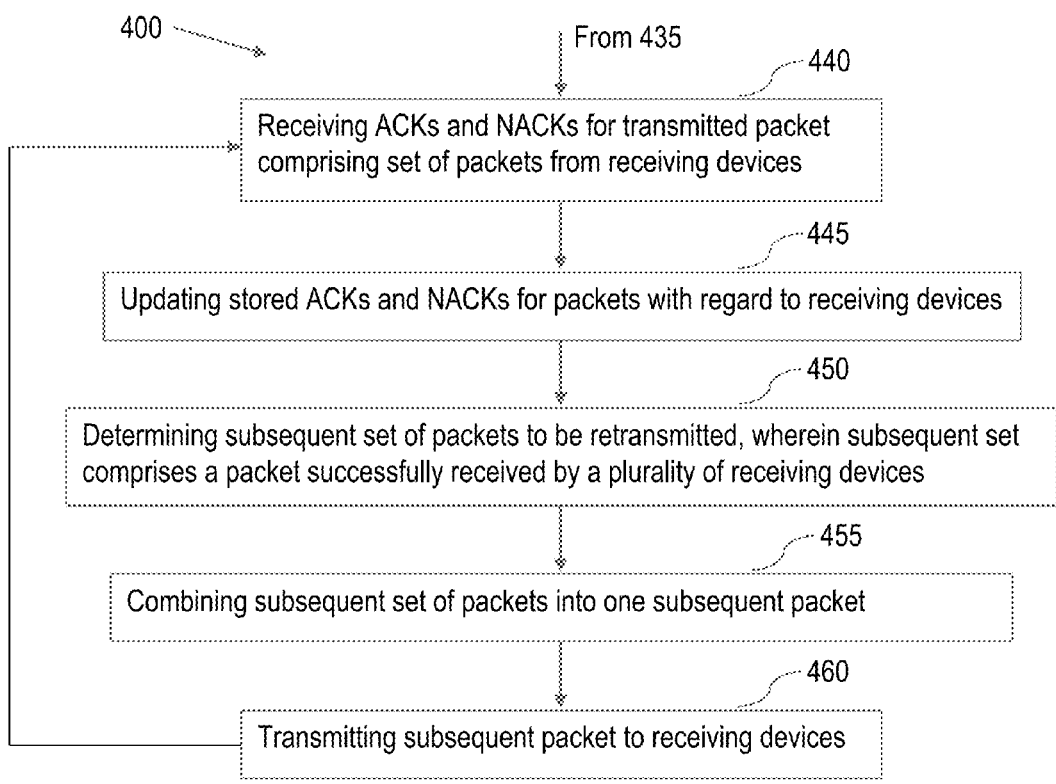
FIG. 4b is a flowchart of a method performed by a wireless transmitting device for performing a broadcast transmission from a transmitting device according to yet an exemplifying embodiment.

Embodiments herein also relate to a method performed by a wireless transmitting device for performing a broadcast transmission of a plurality of packets to receiving devices. Embodiments of such a method will now be explained with reference to FIGS. 4a and 4b. FIGS. 4a and 4b are flowcharts of the method performed by the wireless transmitting device for performing the broadcast transmission from the transmitting device according to exemplifying embodiments.

FIG. 4a illustrates the method comprising transmitting 410 the broadcast transmission of the plurality of packets to the receiving devices; receiving 415 acknowledge, ACK, messages and negative acknowledge, NACK, message(s) for the transmitted plurality of packets from the receiving devices, and storing 420 the ACK or NACK information for each packet with regard to the receiving devices. The method further comprises determining 425 a first set of packets to be retransmitted based on the stored ACK or NACK information for each packet, wherein the first set comprises at least one previously negatively acknowledged packet, or a combination of at least one previously acknowledged packet and at least one previously negatively acknowledged packet. The method also comprises combining 430 the first set of packets into one first packet, and transmitting 435 the first packet to the receiving devices.

As described above, the wireless transmitting device performs a broadcast 410 of a plurality of packets to a plurality of receiving devices. The plurality of receiving devices may be located in different geographical positions within a coverage area of a wireless communication system by means of which the wireless devices communicate. The different geographical positions within the coverage area of the wireless communication system may have different radio conditions or characteristics. Merely as an example, in one geographical position the signal quality may be poor due to e.g. a building blocking a base station, in another geographical position the signal quality may be excellent and yet in another geographical position the signal quality may be poor due to e.g. interference. Consequently, the difference wireless receiving devices may experience quite varying conditions causing e.g. packet loss to various degrees.

The wireless receiving devices send ACK and/or NACKs for the successfully received packets and the unsuccessfully received packets respectively. These different ACKs and NACKs from the individual wireless receiving devices are received 415 by the wireless transmitting device and stored 420 by the wireless transmitting device. The wireless transmitting device stores both information of the respective ACKs and NACKs and which receiving wireless device sent which ACKs and NACKs. In this manner, the wireless transmitting device obtains and keeps information regarding which wireless receiving device successfully received which packet and which wireless receiving device failing to receive which packet.

The wireless transmitting device determines 425 a first set of packets to be retransmitted based on the stored ACK or NACK information for each packet. The first set comprises at least one previously negatively acknowledged packet, or a combination of at least one previously acknowledged packet and at least one previously negatively acknowledged packet. In the special case that only one packet is lost by all receiving devices, then only one packet needs to be retransmitted. However, as described above, the most likely scenario is that a plurality of packets is lost during the broadcast session and thus need to be retransmitted. When a plurality of packets needs to be retransmitted, the first set to be retransmitted comprises at least one previously acknowledged packet and at least one previously negatively acknowledged packet. As described above, different wireless receiving devices may successfully receive different packets and fail to receive different packet. In other words, a single packet of the broadcast may be acknowledged by one wireless receiving device and negatively acknowledged by another wireless receiving device. Thus, the first set of packets may comprise at least one previously acknowledged packet and at least one previously negatively acknowledged packet with respect to at least one of the possibly many wireless receiving devices. Generally, the wireless transmitting device determines the first (or any) set of packets to be retransmitted to comprise at least one packet that has been successfully received by as many wireless receiving devices as possible and at least one packet that has been unsuccessfully received by as many wireless receiving devices as possible.

The method also comprises combining 430 the first set of packets into one first packet, and transmitting 435 the first packet to the receiving devices.

The method performed by the wireless transmitting device may have the same advantages as the method performed by the wireless receiving device. One possible advantage is that it may reduce amount of data sent over the wireless link and thereby may increase the throughput of the system. Another possible advantage is that the retransmission is made more efficient performing closely as efficient as RLNC, which is a theoretical base line.

At possible different points in time following the retransmission 435, the wireless transmitting device may receive 440 ACKs and/or NACKs from the plurality of wireless receiving devices, see FIG. 4b. When the wireless transmitting device receives an ACK and/or a NACK, the wireless transmitting device stores and updates 445 the information relating to which wireless receiving device has successfully and unsuccessfully respectively received which packet.

In an example, the wireless transmitting device determines a matrix wherein the rows of the matrix represent individual wireless receiving devices and the columns represent the packets of the preceding broadcast. This will be explained in more detail in an example later.

The method may further comprise determining 450 a subsequent set of packets to be retransmitted based on the stored ACK or NACK information for each packet, wherein the subsequent set comprises a packet which has been successfully received by a plurality of the receiving devices; combining 455 the subsequent set of packets into one subsequent packet; and transmitting 435 the first packet to the receiving devices.

It shall be pointed out, that FIG. 4b illustrates step 450 taking place after receiving ACKs and/or a NACKs, but that this is merely just an example, the wireless transmitting device may determine the subsequent set of packets to be retransmitted based on the stored ACK or NACK information for each packet directly after determining the first set. The subsequent set preferably comprises at least one previously negatively acknowledged packet which is not comprised in the first set. In case the wireless transmitting device have not received any ACKs and/or NACKs from transmitting the first packet being the first retransmitted packet comprising the first set of packets until determining the subsequent set of packet to be combined and transmitted as a subsequent retransmitted packet, the stored ACK or NACK information is the same for the first and the subsequent set of packets. However, the wireless transmitting device may have received one or more ACKs and/or NACKs and may thus have updated the ACK or NACK information. If so, the subsequent set of packets are determined based on the updated ACK or NACK information for each packet and for each wireless receiving device.

As described above, the method may further comprise receiving 440 ACK and/or NACK messages from the receiving devices at least with regard to the transmitted first packet comprising the first set of packets to be retransmitted; and updating 445 the stored ACK or NACK information for each packet with regard to the receiving devices. The method may further comprise determining 450 a subsequent set of packets to be retransmitted based on the ACK or NACK information for each packet, wherein the subsequent set comprises a packet which has been successfully received by a plurality of the receiving devices; combining 455 the subsequent set of packets into one subsequent packet; and transmitting 460 the subsequent packet to the receiving devices.

In other words, the wireless transmitting device may determine several sets of packets to be retransmitted, the sets of packets comprising at least one previously negatively acknowledged packet without receiving ACKs and/or NACKs. However, as soon as the wireless transmitting device receives an ACK or a NACK, the wireless transmitting device updates the stored ACK or NACK information for each packet with regard to the receiving devices. Whenever the wireless transmitting device determines a set of packets to be retransmitted, it does so based on the stored ACK or NACK information for each packet with regard to the receiving devices.

According to an embodiment, the set of packets to be retransmitted based on the ACK or NACK information for each packet with regard to the receiving devices is determined based on a greedy algorithm.

A greedy algorithm is a step-by-step method for solving a problem, and is sometimes called a single-minded algorithm. It generally performs a single procedure over and over again until it cannot be done any more and determines what kind of results it will produce. A greedy algorithm strives to find an optimum at each stage. Thus, the wireless transmitting devices processes or goes through the stored ACK and NACK information to determine a set of packets to be retransmitted, wherein the set comprises at least one packet which have been previously negatively acknowledged so that the set of packets will hopefully enables as many wireless devices as possible to receive and successfully decode the transmitted packet in order to successfully receive the negatively acknowledged comprised in the set of packets.

Combining 430, 455 the packets into one packet to be retransmitted may further comprise performing an exclusive-or, XOR, on all the packets in the set to be retransmitted.

Generally, an XOR operation of two variables outputs 1 (also referred to as true) if the two variables differ and 0 (also referred to as false) otherwise. Consequently 1 XOR 1 equals 0, 0 XOR 0 equals 0, 1XOR 0 and 0XOR 1 both equals 1. An advantage of using the XOR-operation is that there is no need to use any other operation for decoding the retransmitted packets, and the calculations are much simpler than for the RLNC.

The storage where the partially decoded packets are stored may be a cache storage in a receiver among a plurality of receivers. When a packet is retransmitted in a broadcast or multicast system, the packet may be decoded by one receiver. However, the packet may also be partially decoded by another receiver and stored in a cache storage, also called cache, in that receiver. In the case that the packet is stored, it may be decoded when the decoding requirements are satisfied by packets that are received in subsequent retransmissions.

Figure 1A:
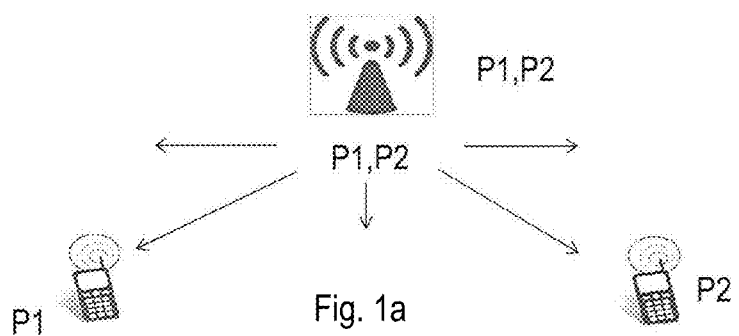
FIGS. 1a and 1b illustrate ARQ-retransmission vs. binary coding scheme.
Figure 1B:
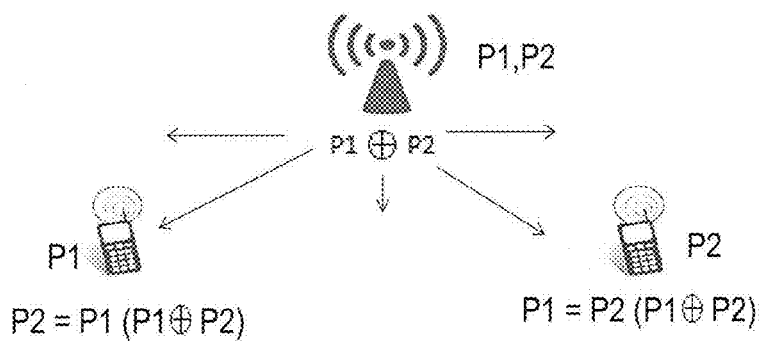
Figure 2:
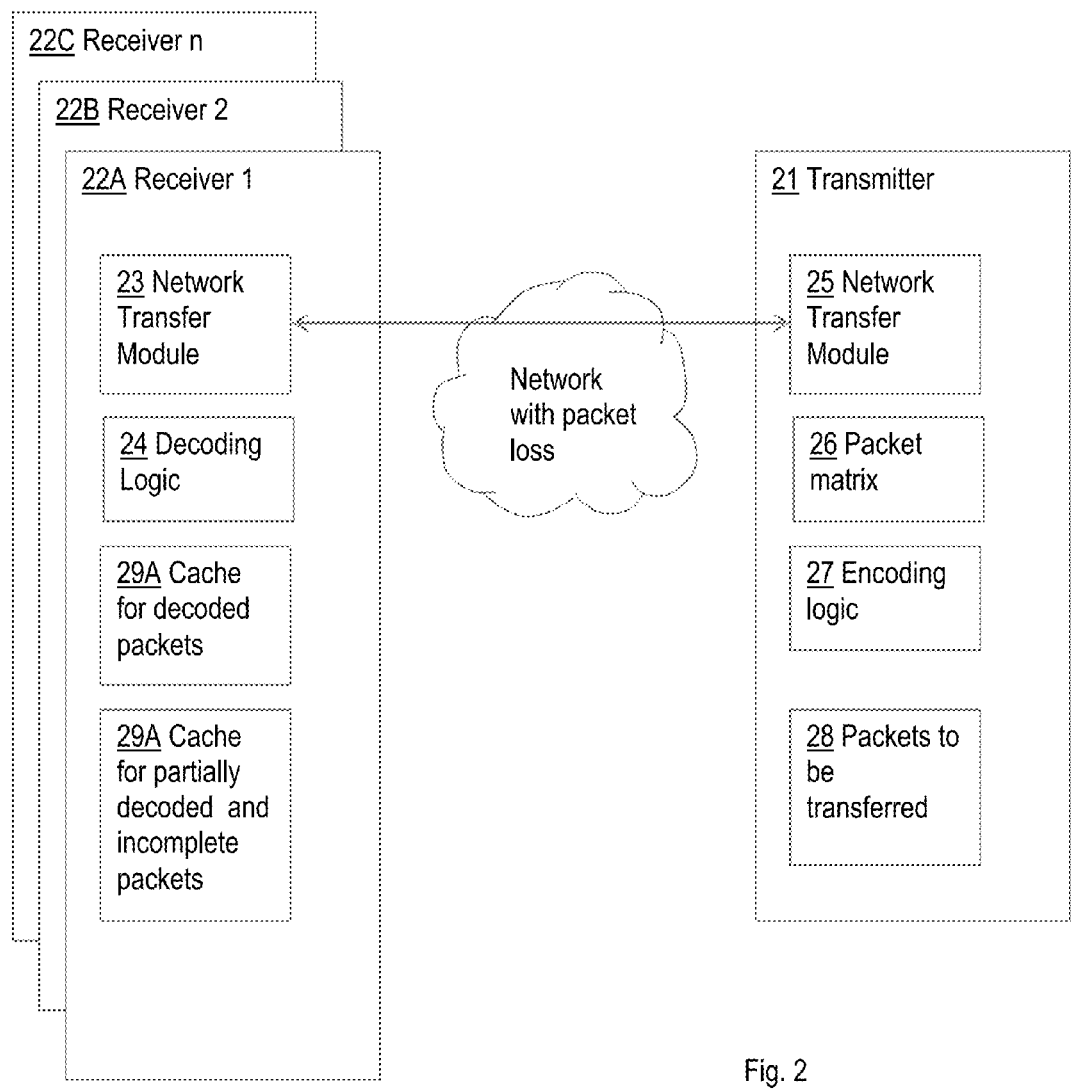
FIG. 2 is a block diagram illustrating proposed apparatuses according to an exemplifying embodiment.

FIG. 2 illustrates a block diagram of one of the possible embodiments. The block diagram shows a plurality of receivers 22A, 22B and 22C and a sender 21 (or transmitter) transmitting packets via a network channel 20 to the receivers where some packets got lost during the transmission. The sender 21 comprises a network transfer module 25, a packet matrix 26, an encoding logic 27 and packets to be transferred 28. Each receiver 22A, 22B and 22C comprises a network transfer module 23, a decoding logic 24, a Level 1 (L1) cache 29A for storing decoded packets and a Level 2 (L2) cache 29B for storing partially decoded packets. However, there is no limitation in having two storages and other solutions may be possible. For instance, both the decoded and partially decoded packets may be stored in a single storage. However, the storing may be performed so the different packets are independent of each other and/or separate from each other. New encoding and decoding algorithms which use the packet cache are described below.

The coding algorithm for a single retransmission is divided in three steps:

1. Selection round 1: This selection may be based on the use of an algorithm, e.g. the greedy algorithm for building a set of packets G, so as many receivers as possible can find a valuable packet in G. However, there is no receiver that can find more than one valuable packet at a time and those receivers than cannot find any valuable packet in G are called remaining receivers.

2. Selection round 2: This selection may be based on the use of for instance the greedy algorithm or a similar algorithm for building a set of packets H, so as many remaining receivers as possible get a valuable packet in H. Moreover, none of the receivers finds more than one valuable packet.

3. Retransmission generation: the retransmission packet R is constructed by XORing all the packets in G and H.

As described above, valuable packets G and H are introduced. In this case, a packet may be valuable to a receiver if the packet is linearly independent to all the packets previously received by the receiver. In order to minimize the total number of retransmissions, in each retransmission a greedy algorithm is used to compose a packet R so it maximizes the number of receivers to whom R is valuable.

In FIG. 3, it is shown a method according to one embodiment wherein a receiver 32A among a plurality of receivers is receiving packets 335 in a transmission phase from a transmitter 21. In step 336, an ACK message is sent to the transmitter for the successfully received packets and a NACK-message for the lost packets so the packets can be retransmitted. In step 337, the receiver is storing the received and decoded packets in L1 cache. Next step 338, the receiver receives the encoded retransmitted packets and starts in step 339 decoding those packets by using the packets stored in L1 cache and L2 cache. In step 340, the packets that were not able to be fully decoded were stored in the L2 cache and those decoded in the L1 cache 341. Step 342 involves the sending of an ACK/NACK message for the retransmitted packets. The procedure in the retransmission phase is repeated until all the transmitted packets are decoded.

In FIG. 4, a method in a transmitter is described. In the transmission phase 435, the receiver 41 broadcasts packets to a plurality of receivers. In step 436, an ACK/NACK is received for the confirming the arrival or loss of the transmitted packets. In 437, an update of the packet matrix is carried out based on the NACK-messages from all the receivers. In 438, the state of the packet matrix is sent to the encoding logic so the selecting and encoding of the packets may start. After the selection in step 439, a new update 440 of the packet matrix is made and encoded data packets 441 are sent to the receivers. According to whether these packets were received or not 442, an ACK or a NACK message is sent. In step 443, the packet matrix is updated again based on the information about retransmission.

The whole procedure performed by the above mentioned embodiment is described in the following signalling diagram. All transmission and responses are done in real-time.

Figure 5:
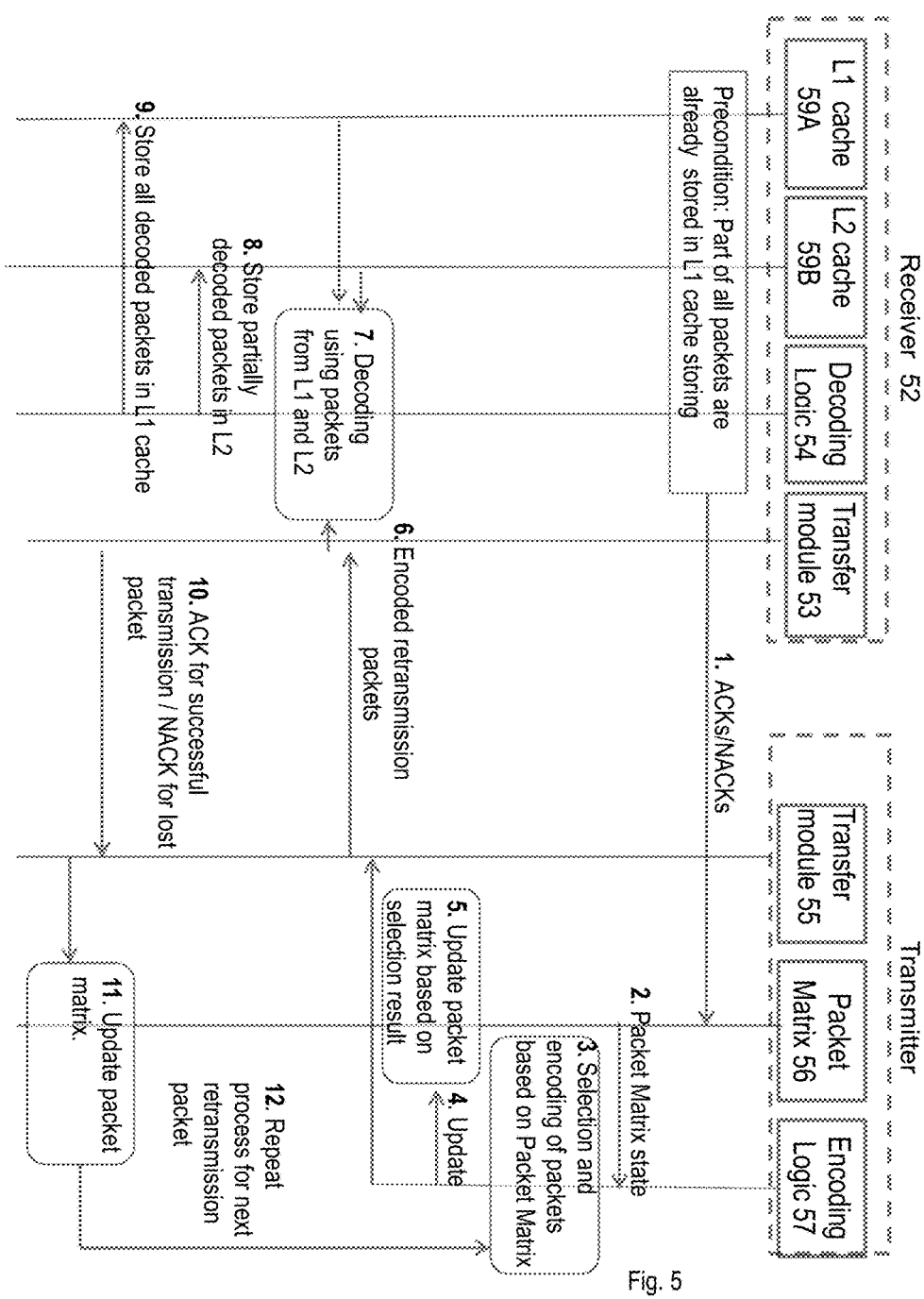
FIG. 5 is a signalling diagram illustrating a general example of an exemplifying embodiment.

As shown in the signalling diagram of FIG. 5, the receiver 52 may only have a part of all packets that were transmitted in a previous transmission attempt stored in L1 cache. The receiver 52 sends 1: a packet matrix update based on previously gathered data to the packet matrix 56 in the transmitter 51. The update may involve sending acknowledgement (ACK) messages when the packets were successfully received or sending non-acknowledgement (NACK) messages when the packets are lost and a retransmission is needed. In this case, we assume that packets have been lost during the transmission phase. In the case that any retransmission packet was not received during the retransmission phase, the retransmission procedure is then repeated until all the packets are stored in either L1 cache or L2 cache. In 2: the packet matrix state is sent from the packet matrix 56 to the encoding logic 57 for 3: selecting a set of packets to be encoded and retransmitted to the receivers 52. The selection is based on an algorithm that makes as many receivers as possible to find a valuable and missing packet in the selected set. However, each receiver will not be able to find more than one valuable packet in the set and some of them may not even find any valuable packet at this stage. After the selection and encoding, the packet matrix 56 is 4: updated based on the selection result 5: and 6: the selected set of encoded packets are retransmitted to the transfer module 53 to be decoded by the decoding logic 54 which 7: decodes the set of packets first by means of using the decoded packets stored in L1 cache. If no new information is gained from the decoding then the packets should be discarded. However, if the packet was only partially decoded, the packet should be stored in L1 cache and if fully decoded, the packet should be used for decode all related packets stored in L2 cache. Moreover, if other new packets are decoded during this attempt, these new packets are then used to decode other remaining packets stored in L2 cache. These steps may be repeated until all attempts are processed.

8: In other words, the retransmitted set of packets may have partially-decoded packets stored in L2 cache and 9: the remaining fully decoded packets are stored in the L1 cache. 10: An ACK message is sent to the transfer module 55 in the transmitter 51 for successful transmission and NACK for lost packets. At this stage, 11: an update of the packet matrix 56 is carried out according to which packets are retransmitted and which packets are successfully being received. In 12: the process is repeated for next retransmission packet.

Figure 6:
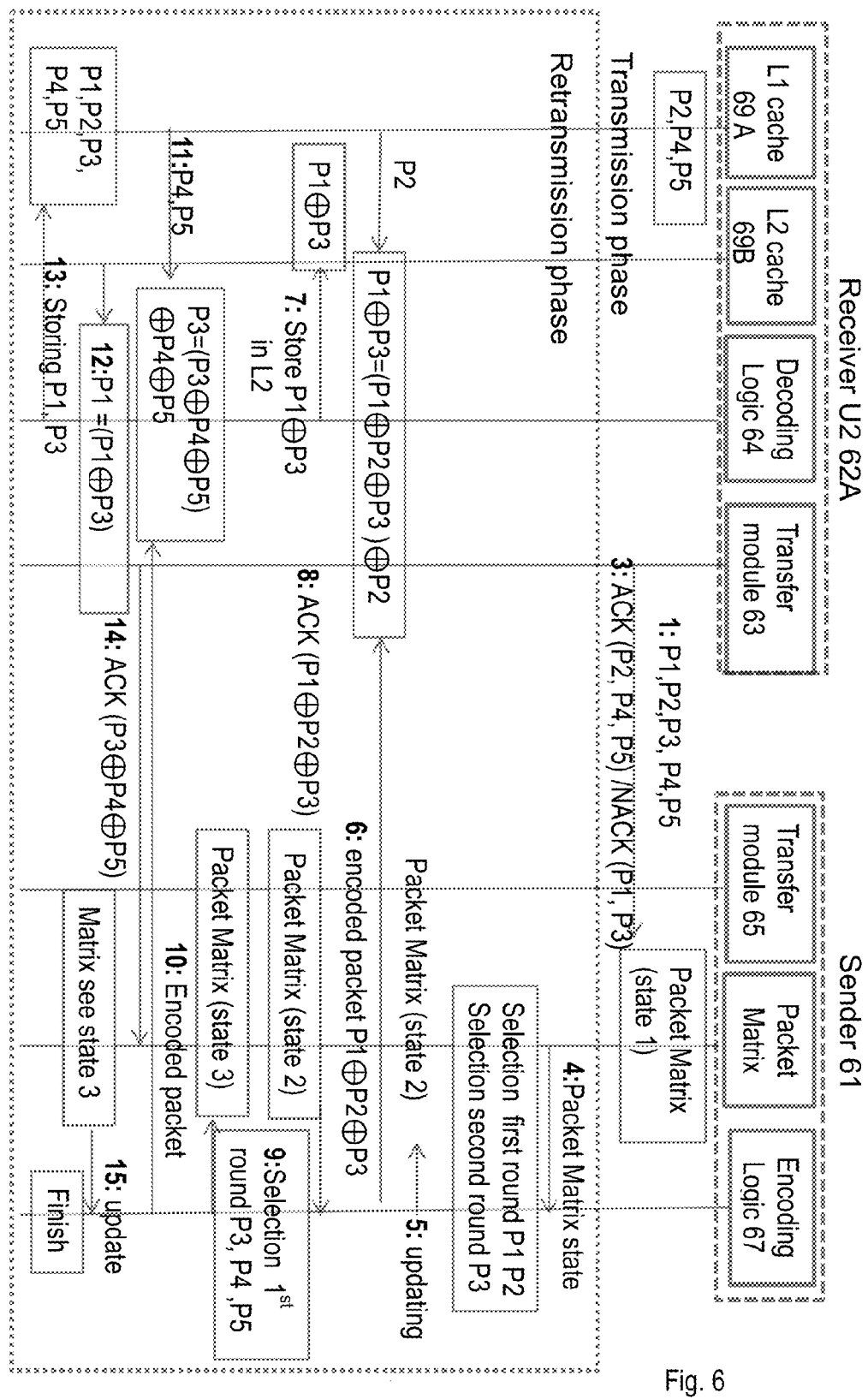
FIG. 6 is a signalling diagram illustrating a specific example of an exemplifying embodiment.

A specific example of the signalling diagram described in FIG. 5 is shown in FIG. 6. In the transmission phase, 1: the sender or transmitter 61 sends a broadcast data with five packets P1, P2, P3, P4, P5 to a plurality of the transfer module 63 placed in the receivers 62, here referred as to U1, U2, U3, etc. simultaneously. In this diagram, only the receiver U2 will be considered for a better understanding. In this case, the packets P1 and P3 are lost and P2, P4 and P5 are decoded and 2: stored in the L1 cache. 3: A message with ACK for successfully received packets P2, P4 and P5 and NACK for lost packets P1 and P3 is sent to the transmitter 61 from the transfer module 63 in the receiver 62A.

Figure 7:
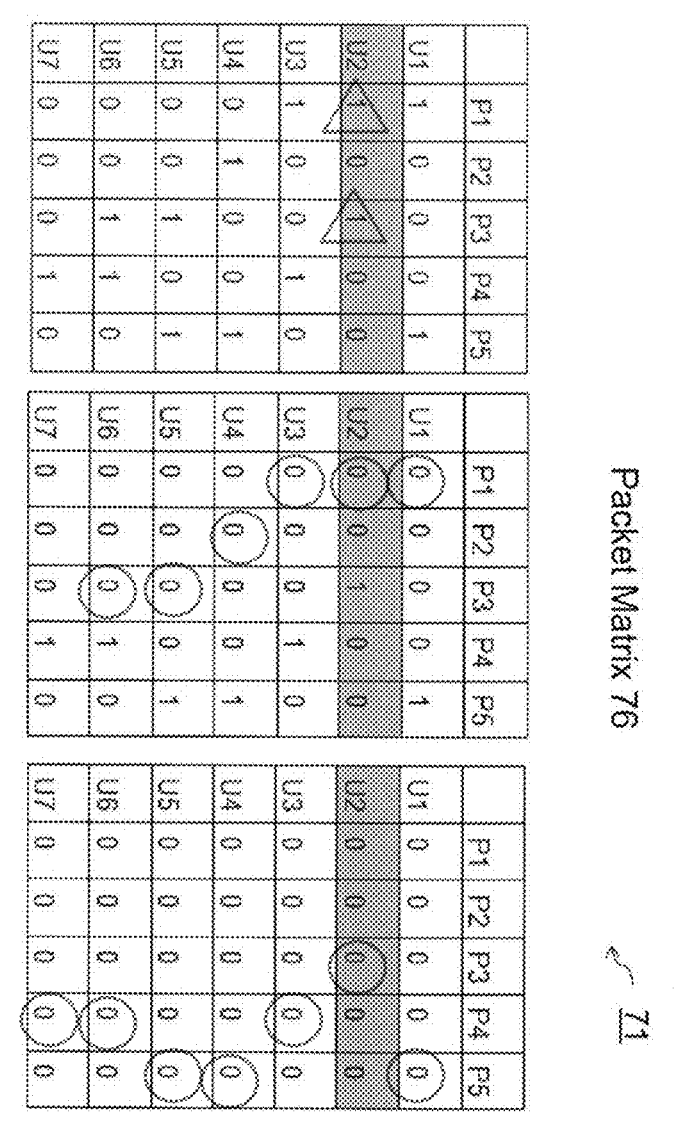

In the retransmission phase, the packet matrix 66, 76 in the transmitter 61, 71 shows three different transmission states for each packet and receiver. In FIG. 7, it can be seen that in the first state of the packet matrix 76, P1 and P3 are missing (denoted as "1" and marked with a triangle shape) for U2. For other receivers like U5, the packets P3 and P5 are missing. In the second state which is the second matrix in FIG. 7, it can be noted for instance that P1 is now received by U1-U3, P2 by U4 and P3 by U5-U6. The "1"-values are now changed to "0"-values and are marked here with a circle shape. The third matrix shows the third state of the packet matrix 76 and even here a few more changes have been made which means that all lost packets have been received by all the receivers. In 4: the information about the state of the packet matrix is sent to encoding logic 67, where the selection of the retransmitted packets is made to be subsequently encoded and sent to the receivers 62. The encoding logic uses the three steps in the coding algorithm which involves selecting a first set that is in this case P1 and P2. These packets were lost for many of the receivers and are therefore valuable packets. In the second set, the encoding logic picks up P3 for retransmitting because the receivers U2, U5 and U6 have lost this packet. 5: The next step is to both update the state of the packet matrix and 6: send the both sets of packets encoded with XOR. 7: Once the packet was acknowledged and received by the decoding logic 64, the packet attempts to be decoded by using the packet P2 stored in L1 cache. The result is a partially-decoded packet P1⊕P3 (instead of the sent packet P1⊕P2⊕P3) which is stored in the L2 cache. 8: When the ACK message arrived at the packet matrix 66 in the transmitter 61, 9: the encoding logic 67 selects once again another set of packets according to the new updated matrix state. Here, it is only needed a first round of selection which is P3, P4 and P5. 10: These are encoded by XORing them and sent those to the decoding logic 54 in the receivers 62. The receiver U2 decodes the packet by 11: using the decoded packets P4 and P5 from the L1 cache and 12: the partially-decoded P1⊕P3 from the L2 cache. 13: The decoding results in obtaining P1 and P3 to be stored in the L1 cache together with all the rest of the transmitted data, i.e. P2, P4, and P5. 14: An ACK message is sent to the packet matrix 66 in the transmitter 61 so 15: the state of the packet matrix can be updated.

In this example, it is assumed that the retransmissions are successfully received by all the receivers and the modifications to the Packet Matrix are set according to the NACK messages.

As previously explained, FIG. 6 represents the transmission states according to ACK/NACK acknowledgements from the receivers. The rows represent the receivers, U1-U7, and the columns represent the packets P1-P5. For each successfully received packet k by a receiver i, the matrix $T_{i,k}$ is set to 0. Otherwise, if a packet is lost by the receiver i, the cell in the matrix $T_{i,k}$ is set to 1.

Figure 8:
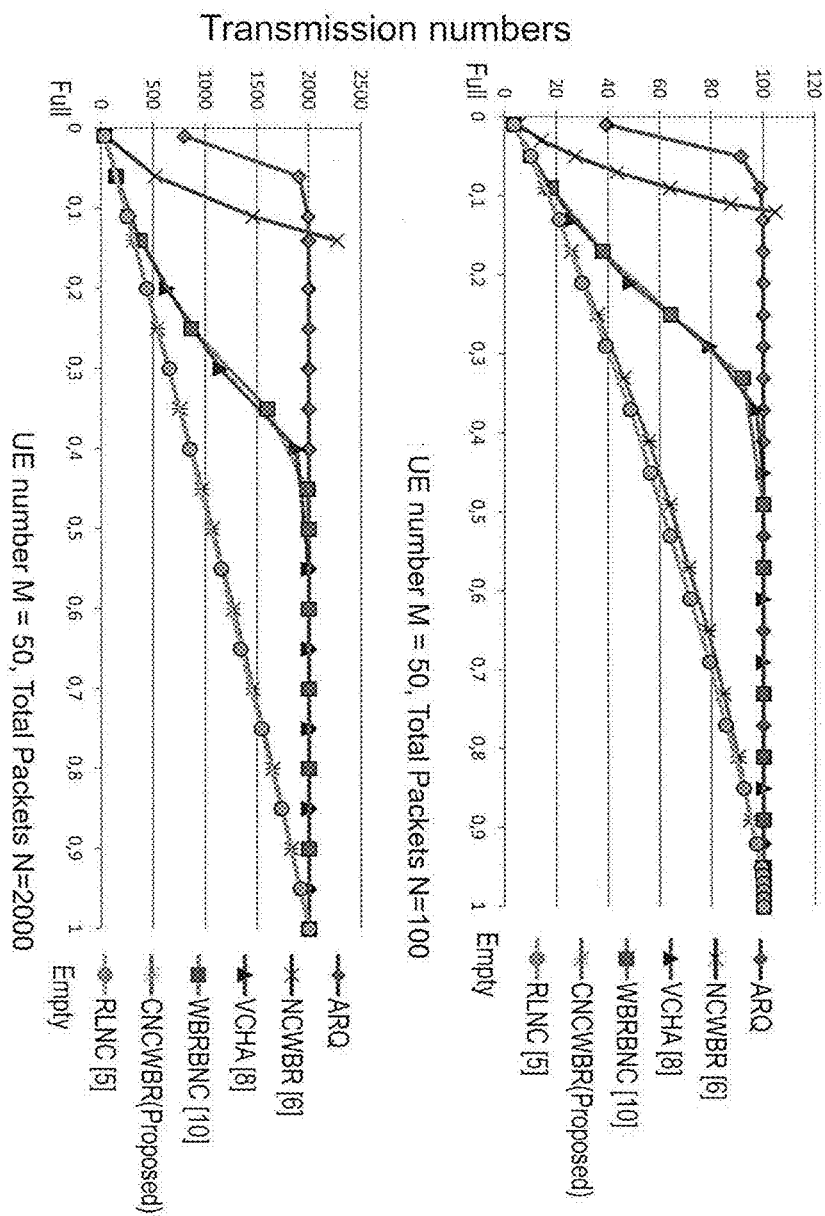
FIG. 8 are graphs illustrating the performance of the method according to an embodiment.

FIGS. 8*a* and 8*b* illustrate simulation results from different known algorithms in comparison with one of the present proposed methods, the Cached Network Coding in Wireless Broadcast Retransmission (CNCWBR). The Y-axis shows the transmission numbers and the X-axis shows the cache emptiness of each receiver following the Bernoulli distribution of the emptiness rate. FIG. 8*a* shows the results for 50 receivers and 100 packets transmitted while FIG. 8*b* shows the results for 50 receivers and 2000 packets transmitted. It is clear from the figures that the proposed CNCWBR method is one of the most efficient coding methods. Moreover, in comparison with other network coding methods, the CNCWBR-like methods are less complex.

Embodiments herein also relate to a wireless receiving device adapted for receiving a transmission from a transmitting device following a broadcast transmission of a plurality of packets from the transmitting device. The wireless receiving device has the same objects, technical features and advantages as the method performed thereby. The wireless receiving device will only be described in brief in order to avoid unnecessary repetition.

Figure 9:
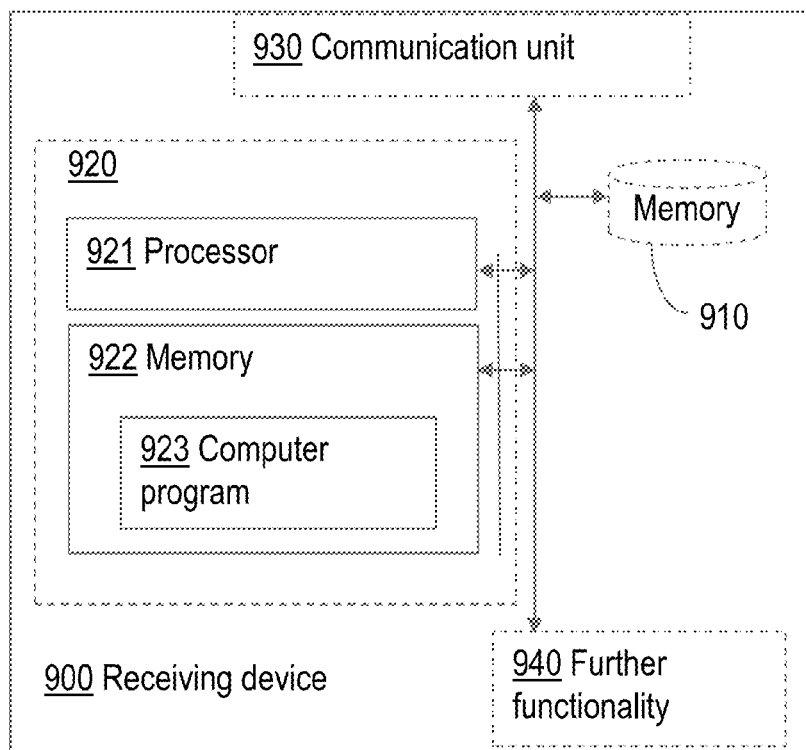
FIG. 9 is a block diagram of a wireless receiving device adapted for receiving a transmission from a transmitting device according to an exemplifying embodiment.

FIG. 9 is a block diagram of a wireless receiving device 900 adapted for receiving a transmission from a transmitting device according to an exemplifying embodiment.

During the broadcast transmission, packets successfully received have been acknowledged to the transmitting device and stored in a memory associated with the receiving device and unsuccessfully received packets have been negatively acknowledged to the transmitting device. The wireless receiving device 900 comprises a processor 921 and a memory 922. The memory comprises instructions which when executed by the processor causes the wireless receiving device 900 to receive a retransmission of a packet from the transmitting device; and to decode the received retransmitted packet using stored previously successfully decoded packets, wherein if the received retransmitted packet is successfully decoded then decode stored previously partially decoded packets using the successfully decoded packet. The instructions in the memory which when executed by the processor further causes the wireless receiving device 900 to store the successfully decoded packet and/or the partially decoded packet; and to send, to the transmitting device, an acknowledge, ACK, message with respect to the received retransmitted packet.

The wireless receiving device has the same possible advantages as the method performed by the wireless receiving device. One possible advantage is that it may reduce amount of data sent over the wireless link and thereby may increase the throughput of the system. Another possible advantage is that the retransmission is made more efficient performing closely as efficient as RLNC, which is a theoretical base line.

The received packet by the retransmission may comprise at least one previously negatively acknowledged packet, or a combination of at least one previously acknowledged packet and at least one previously negatively acknowledged packet.

The memory 922 may further comprise instructions which when executed by the processor 921 causes the wireless receiving device 900 to, if an at least one previously negatively acknowledged packet comprised in the received retransmitted packet was successfully decoded, decode stored previously partially decoded packets using the successfully decoded packet(s) of the received retransmitted packet.

The memory 922 may still further comprise instructions which when executed by the processor 921 causes the wireless receiving device 900 to, if a stored previously partially decoded packet is successfully decoded using the successfully decoded packet(s) of the received retransmitted packet, decode anew stored previously partially decoded packets using the most recently successfully decoded packet.

Embodiments herein also relate to a wireless transmitting device adapted for performing a broadcast transmission of a plurality of packets to receiving devices. The wireless transmitting device has the same objects, technical features and advantages as the method performed thereby. The wireless transmitting device will only be described in brief in order to avoid unnecessary repetition.

Figure 10:
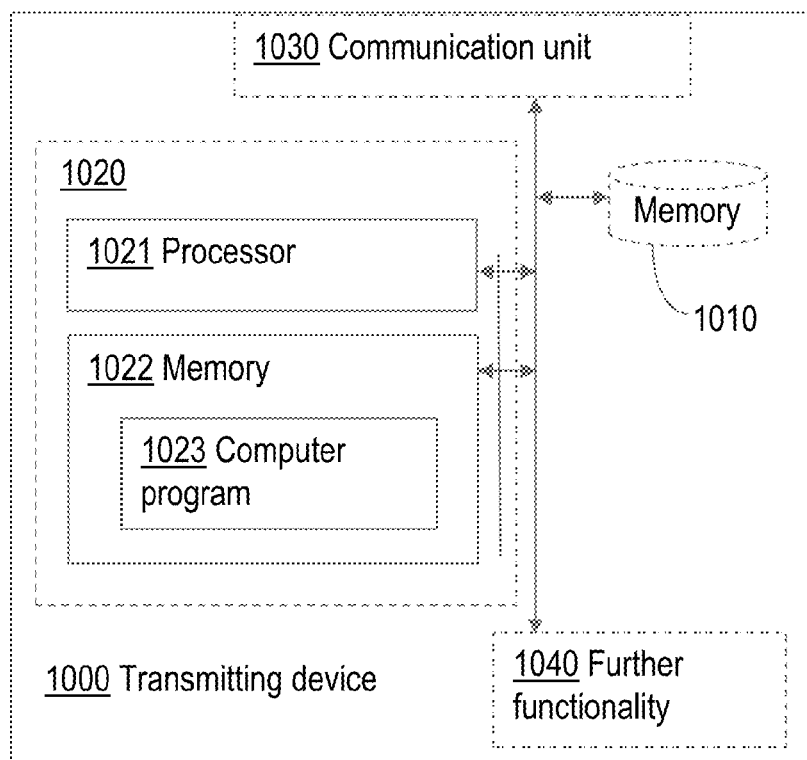
FIG. 10 is a block diagram of a wireless transmitting device adapted for performing a broadcast transmission from a transmitting device according to an exemplifying embodiment.

FIG. 10 is a block diagram of a wireless receiving device adapted for receiving a transmission from a transmitting device according to an exemplifying embodiment.

FIG. 10 illustrates the wireless transmitting device 1000 comprising a processor 1021 and a memory 1022, the memory comprising instructions which when executed by the processor causes the wireless transmitting device 1000 to transmit the broadcast transmission of the plurality of packets to the receiving devices; receive acknowledge, ACK, messages and negative acknowledge, NACK, message(s) for the transmitted plurality of packets from the receiving devices; and to store the ACK or NACK information for each packet with regard to the receiving devices. The memory further comprises instructions which when executed by the processor causes the wireless transmitting device 1000 to determine a first set of packets to be retransmitted based on the stored ACK or NACK information for each packet, wherein the first set comprises at least one previously negatively acknowledged packet, or a combination of at least one previously acknowledged packet and at least one previously negatively acknowledged packet; to combine the first set of packets into one first packet; and to transmit the first packet to the receiving devices.

The wireless transmitting device has the same possible advantages as the method performed by the wireless transmitting device. One possible advantage is that it may reduce amount of data sent over the wireless link and thereby may increase the throughput of the system. Another possible advantage is that the retransmission is made more efficient performing closely as efficient as RLNC, which is a theoretical base line.

The memory 1022 may further comprise instructions which when executed by the processor 1021 causes the wireless transmitting device 1000 to determine a subsequent set of packets to be retransmitted based on the stored ACK or NACK information for each packet, wherein the subsequent set comprises a packet which has been successfully received by a plurality of the receiving devices; to combine the subsequent set of packets into one subsequent packet; and to transmit the first packet to the receiving devices.

Still further, the memory 1022 may comprise instructions which when executed by the processor 1021 causes the wireless transmitting device 1000 to receive ACK and/or NACK messages from the receiving devices at least with regard to the transmitted first packet comprising the first set of packets to be retransmitted; to receive ACK and/or NACK messages from the receiving devices at least with regard to the transmitted first packet comprising the first set of packets to be retransmitted, and to update the stored ACK or NACK information for each packet with regard to the receiving devices. Further, the memory 1022 may comprise instructions which when executed by the processor 1021 causes the wireless transmitting device 1000 to determine a subsequent set of packets to be retransmitted based on the ACK or NACK information for each packet, wherein the subsequent set comprises a packet which has been successfully received by a plurality of the receiving devices; to combine the subsequent set of packets into one subsequent packet; and to transmit the subsequent packet to the receiving devices.

The set of packets to be retransmitted based on the ACK or NACK information for each packet may be determined based on a greedy algorithm.

Combining the packets into one packet to be retransmitted may comprise performing an exclusive-or, XOR, on all the packets in the set to be retransmitted.

Embodiments herein also relate to a wireless receiving device for receiving a transmission from a transmitting device following a broadcast transmission of a plurality of packets from the transmitting device. The wireless receiving device has the same objects, technical features and advantages as the method performed thereby. The wireless receiving device will only be described in brief in order to avoid unnecessary repetition.

Figure 11:
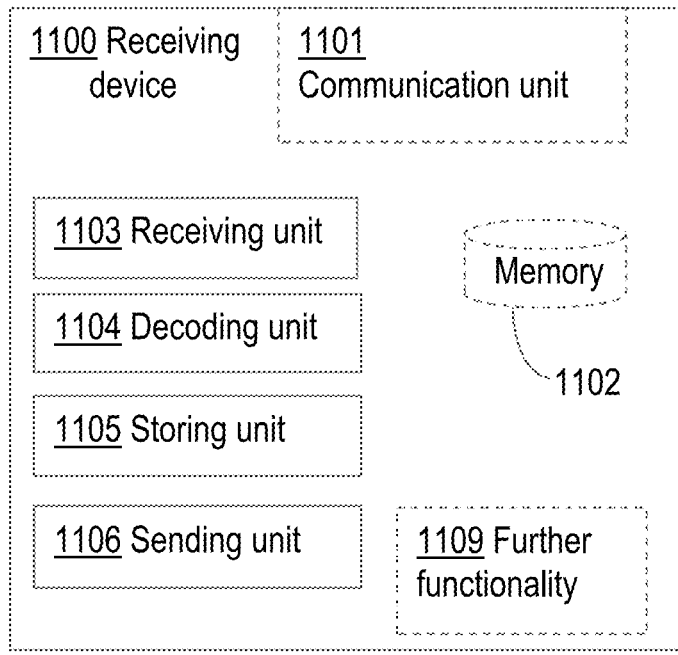
FIG. 11 is a block diagram of a wireless receiving device for receiving a transmission from a transmitting device according to an exemplifying embodiment.

FIG. 11 is a block diagram of a wireless receiving device 1100 for receiving a transmission from a transmitting device according to an exemplifying embodiment.

During the broadcast transmission, packets successfully received have been acknowledged to the transmitting device and stored in a memory associated with the receiving device and unsuccessfully received packets have been negatively acknowledged to the transmitting device. FIG. 11 illustrates the wireless receiving device 1100 comprising a receiving unit 1103 for receiving a retransmission of a packet from the transmitting device; and a decoding unit 1104 for decoding the received retransmitted packet using stored previously successfully decoded packets, and for decoding stored previously partially decoded packets using the successfully decoded packet if the received retransmitted packet is successfully decoded. The wireless receiving device 1100 further comprises a storing unit 1105 for storing the successfully decoded packet and/or the partially decoded packet; and a sending unit 1106 for sending, to the transmitting device, an acknowledge, ACK, message with respect to the received retransmitted packet.

The wireless receiving device has the same possible advantages as the method performed by the wireless receiving device. One possible advantage is that it may reduce amount of data sent over the wireless link and thereby may increase the throughput of the system. Another possible advantage is that the retransmission is made more efficient performing closely as efficient as RLNC, which is a theoretical base line.

Embodiments herein also relate to a wireless transmitting device for performing a broadcast transmission of a plurality of packets to receiving devices. The wireless transmitting device has the same objects, technical features and advantages as the method performed thereby. The wireless transmitting device will only be described in brief in order to avoid unnecessary repetition.

Figure 12:
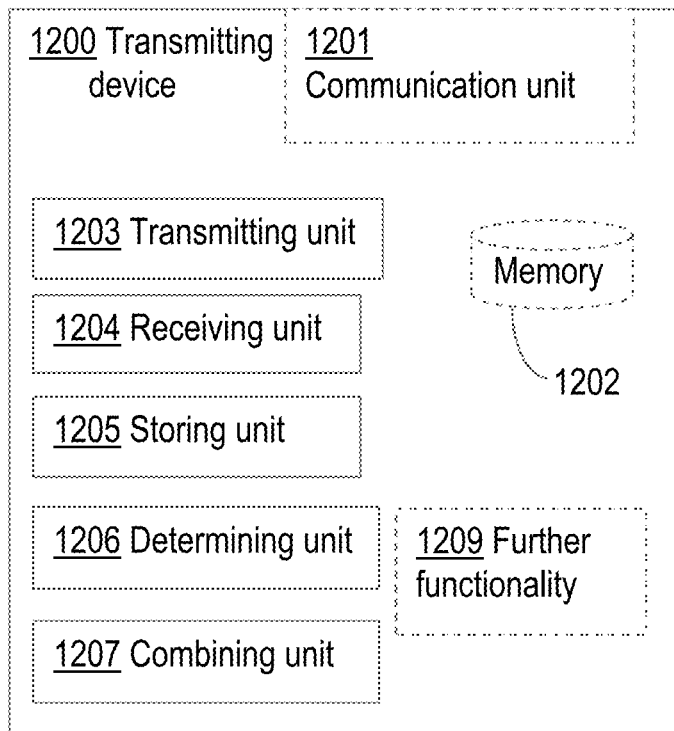
FIG. 12 is a block diagram of a wireless transmitting device for performing a broadcast transmission from a transmitting device according to an exemplifying embodiment.

FIG. 12 is a block diagram of a wireless transmitting device 1200 for performing a broadcast transmission of a plurality of packets to receiving devices according to an exemplifying embodiment.

FIG. 12 illustrates the wireless transmitting device 1200 comprising a transmitting unit 1203 for transmitting the broadcast transmission of the plurality of packets to the receiving devices; a receiving unit 1204 for receiving acknowledge, ACK, messages and negative acknowledge, NACK, message(s) for the transmitted plurality of packets from the receiving devices; and a storing unit 1205 for storing the ACK or NACK information for each packet with regard to the receiving devices. The wireless transmitting device 1200 further comprises a determining unit 1206 for determining a first set of packets to be retransmitted based on the stored ACK or NACK information for each packet, wherein the first set comprises at least one previously negatively acknowledged packet, or a combination of at least one previously acknowledged packet and at least one previously negatively acknowledged packet; and a combining unit 1207 for combining the first set of packets into one first packet; wherein the transmitting unit 1203 also is for transmitting the first packet to the receiving devices.

The wireless transmitting device has the same possible advantages as the method performed by the wireless transmitting device. One possible advantage is that it may reduce amount of data sent over the wireless link and thereby may increase the throughput of the system. Another possible advantage is that the retransmission is made more efficient performing closely as efficient as RLNC, which is a theoretical base line.

Embodiments herein also relate to an arrangement in a wireless receiving device adapted for receiving a transmission from a transmitting device following a broadcast transmission of a plurality of packets from the transmitting device. Further, embodiments herein also relate to an arrangement in a wireless transmitting device adapted for performing a broadcast transmission of a plurality of packets to receiving devices. These different embodiments will be described below with reference to FIGS. 13 and 14.

In FIG. 11, the wireless receiving device 1100 is also illustrated comprising a communication unit 1101. Through this unit, the wireless receiving device 1100 is adapted to communicate with other nodes and/or entities in the wireless communication network, e.g. the wireless transmitting device described above. The communication unit 1101 may comprise more than one receiving arrangement and transmitting arrangement. For example, the communication unit may be connected to both a wire and an antenna, by means of which the wireless receiving device 1100 is enabled to communicate with other nodes and/or entities in the wireless communication network. The wireless receiving device 1100 further comprises a memory 1102 for storing data. Further, the wireless receiving device 1100 may comprise a control or processing unit which in turns is connected to the different units 1103-1106. It shall be pointed out that this is merely an illustrative example and the wireless receiving device 1100 may comprise more, less or other units or modules which execute the functions of the wireless receiving device 1100 in the same manner as the units illustrated in FIG. 11.

It should be noted that FIG. 11 merely illustrates various functional units in the wireless receiving device 1100 in a logical sense. The functions in practice may be implemented using any suitable software and hardware means/circuits etc. Thus, the embodiments are generally not limited to the shown structures of the wireless receiving device 1100 and the functional units. Hence, the previously described exemplary embodiments may be realised in many ways. For example, one embodiment includes a computer-readable medium having instructions stored thereon that are executable by the control or processing unit for executing the method steps in the wireless receiving device 1100. The instructions executable by the computing system and stored on the computer-readable medium perform the method steps of the wireless receiving device 1100 as set forth in the claims.

In FIG. 12, the wireless transmitting device 1200 is also illustrated comprising a communication unit 1201. Through this unit, the wireless transmitting device 1200 is adapted to communicate with other nodes and/or entities in the wireless communication network, e.g. a plurality of wireless receiving devices described above. The communication 1201 411 may comprise more than one receiving arrangement and transmitting arrangement. For example, the communication unit may be connected to both a wire and an antenna, by means of which the wireless transmitting device 1200 is enabled to communicate with other nodes and/or entities in the wireless communication network. The wireless transmitting device 1200 further comprises a memory 1202 for storing data. Further, the wireless transmitting device 1200 is may comprise a control or processing unit which in turns is connected to the different units 1203-1207. It shall be pointed out that this is merely an illustrative example and the wireless transmitting device 1200 may comprise more, less or other units or modules which execute the functions of the wireless transmitting device 1200 in the same manner as the units illustrated in FIG. 12.

It should be noted that FIG. 12 merely illustrates various functional units in the wireless transmitting device 1200 in a logical sense. The functions in practice may be implemented using any suitable software and hardware means/circuits etc. Thus, the embodiments are generally not limited to the shown structures of the wireless transmitting device 1200 and the functional units. Hence, the previously described exemplary embodiments may be realised in many ways. For example, one embodiment includes a computer-readable medium having instructions stored thereon that are executable by the control or processing unit for executing the method steps in the wireless transmitting device 1200. The instructions executable by the computing system and stored on the computer-readable medium perform the method steps of the wireless transmitting device 1200 as set forth in the claims.

Figure 13:
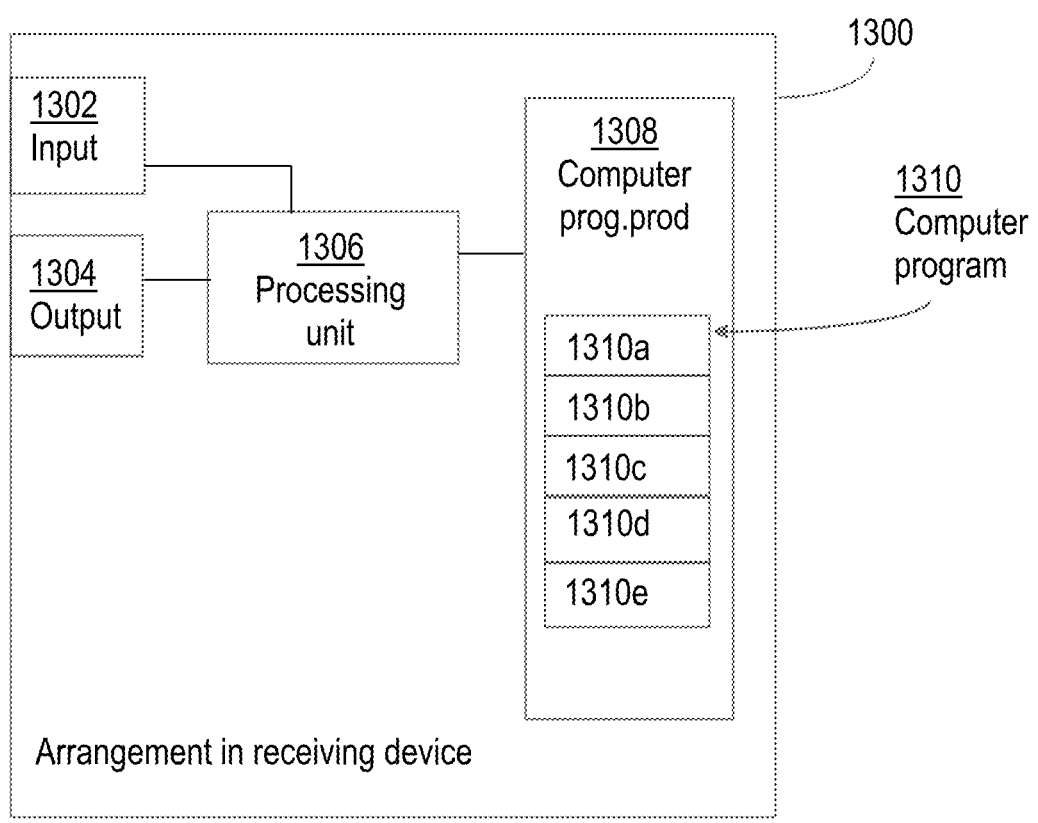
FIG. 13 is a block diagram of an arrangement in a wireless receiving device for receiving a transmission from a transmitting device according to an exemplifying embodiment.

FIG. 13 schematically shows an embodiment of an arrangement in a wireless receiving device 1300. Comprised in the wireless receiving device 1300 are here a processing unit 1306, e.g. with a DSP (Digital Signal Processor). The processing unit 1306 may be a single unit or a plurality of units to perform different actions of procedures described herein. The wireless receiving device 1300 may also comprise an input unit 1302 for receiving signals from other entities, and an output unit 1304 for providing signal(s) to other entities. The input unit and the output unit may be arranged as an integrated entity or as illustrated in the example of FIG. 11, as one or more interfaces 1101.

Furthermore, the wireless receiving device 1300 comprises at least one computer program product 1308 in the form of a non-volatile memory, e.g. an EEPROM (Electrically Erasable Programmable Read-Only Memory), a flash memory and a hard drive. The computer program product 1308 comprises a computer program 1310, which comprises code means, which when executed in the processing unit 1306 in the wireless receiving device 1300 causes the wireless receiving device 1300 to perform the actions e.g. of the procedure described earlier in conjunction with FIGS. 3a and 3b.

The computer program 1310 may be configured as a computer program code structured in computer program modules 1310a-1310e. Hence, in an exemplifying embodiment, the code means in the computer program of the wireless receiving device 1300 comprises a receiving unit, or module, for receiving a retransmission of a packet from the transmitting device; and a decoding unit, or module, for decoding the received retransmitted packet using stored previously successfully decoded packets, and for decoding stored previously partially decoded packets using the successfully decoded packet if the received retransmitted packet is successfully decoded. The computer program further comprises a storing unit, or module for storing the successfully decoded packet and/or the partially decoded packet; and a sending unit, or module, for sending, to the transmitting device, an acknowledge, ACK, message with respect to the received retransmitted packet.

The computer program modules could essentially perform the actions of the flow illustrated in FIGS. 3a and 3b, to emulate the wireless receiving device 1300. In other words, when the different computer program modules are executed in the processing unit 1306, they may correspond to the units 1103-1106 of FIG. 11.

Figure 14:
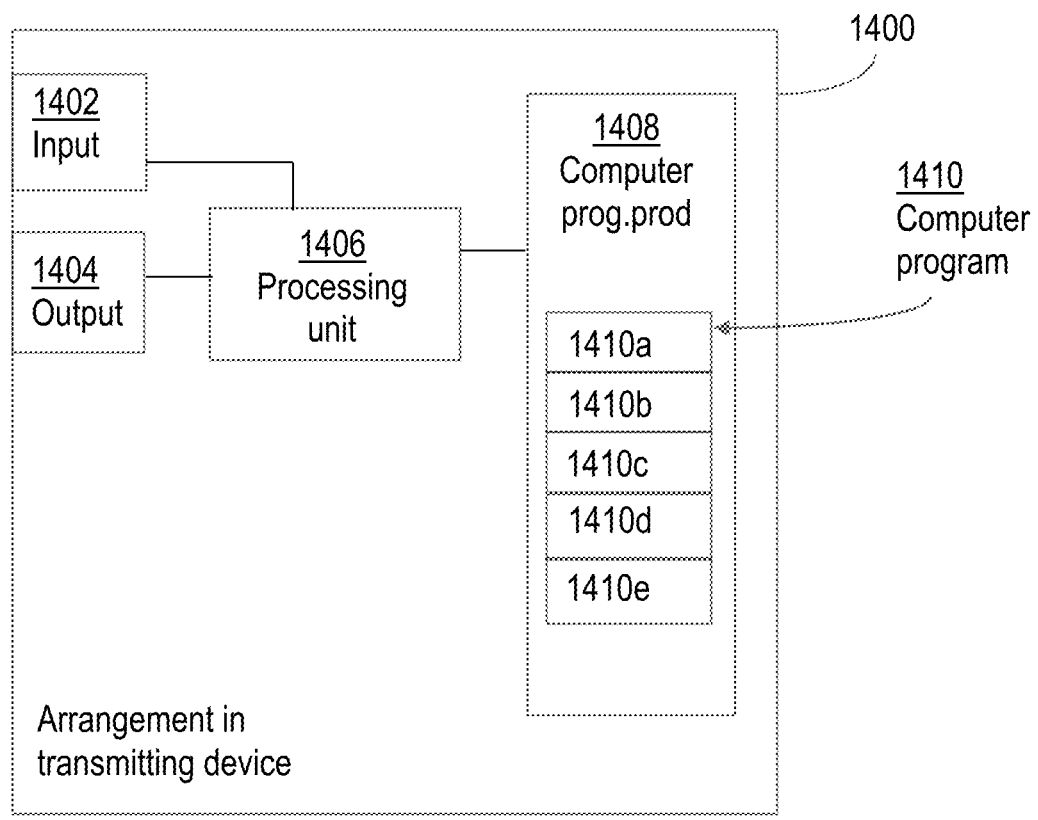
FIG. 14 is a block diagram of an arrangement in a wireless transmitting device for performing a broadcast transmission from a transmitting device according to an exemplifying embodiment.

FIG. 14 schematically shows an embodiment of a wireless transmitting device 1400. Comprised in the wireless transmitting device 1400 are here a processing unit 1406, e.g. with a DSP (Digital Signal Processor). The processing unit 1406 may be a single unit or a plurality of units to perform different actions of procedures described herein. The wireless transmitting device 1400 may also comprise an input unit 1402 for receiving signals from other entities, and an output unit 1404 for providing signal(s) to other entities. The input unit and the output unit may be arranged as an integrated entity or as illustrated in the example of FIG. 12, as one or more interfaces 1201.

Furthermore, the wireless transmitting device 1400 comprises at least one computer program product 1408 in the form of a non-volatile memory, e.g. an EEPROM (Electrically Erasable Programmable Read-Only Memory), a flash memory and a hard drive. The computer program product 1408 comprises a computer program 1410, which comprises code means, which when executed in the processing unit 1406 in the wireless transmitting device 1400 causes the wireless transmitting device 1400 to perform the actions e.g. of the procedure described earlier in conjunction with FIGS. 4*a* and 4*b*.

The computer program 1410 may be configured as a computer program code structured in computer program modules 1410*a*-1410*e*. Hence, in an exemplifying embodiment, the code means in the computer program of the wireless transmitting device 1400 comprises a transmitting unit, or module, for transmitting the broadcast transmission of the plurality of packets to the receiving devices; a receiving unit, or module, for receiving acknowledge, ACK, messages and negative acknowledge, NACK, message(s) for the transmitted plurality of packets from the receiving devices; and a storing unit, or module, for storing the ACK or NACK information for each packet with regard to the receiving devices. The computer program further comprises a determining unit, or module, for determining a first set of packets to be retransmitted based on the stored ACK or NACK information for each packet, wherein the first set comprises at least one previously negatively acknowledged packet, or a combination of at least one previously acknowledged packet and at least one previously negatively acknowledged packet; and a combining unit, or module, for combining the first set of packets into one first packet; wherein the transmitting unit, or module, also is for transmitting the first packet to the receiving devices.

The computer program modules could essentially perform the actions of the flow illustrated in FIGS. 4*a* and 4*b*, to emulate the wireless transmitting device 1400. In other words, when the different computer program modules are executed in the processing unit 1406, they may correspond to the units 1203-1207 of FIG. 12.

Although the code means in the respective embodiments disclosed above in conjunction with FIGS. 11 and 12 are implemented as computer program modules which when executed in the respective processing unit causes the wireless receiving device and the wireless transmitting device respectively to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the wireless receiving device and the wireless transmitting device respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a wireless receiving device for receiving a retransmission of a packet from a transmitting device following a broadcast transmission of a plurality of packets from the transmitting device, wherein packets successfully decoded during the broadcast transmission have been acknowledged by the wireless receiving device to the transmitting device and stored in a memory associated with the wireless receiving device and unsuccessfully decoded packets have been negatively acknowledged by the wireless receiving device to the transmitting device, the method comprising:
    receiving the retransmission of the packet from the transmitting device;
    sending, to the transmitting device, an acknowledge, ACK, message with respect to the received retransmitted packet;
    decoding the received retransmitted packet using the stored previously successfully decoded packets;
    based on a determination that the received retransmitted packet was successfully decoded, decoding stored previously partially decoded retransmitted packets if any using the successfully decoded packet, and storing the successfully decoded packet; and,
    based on a determination that the received retransmitted packet was only partially successfully decoded, storing the partially decoded retransmitted packet.

2. The method according to claim 1, wherein the received packet by the retransmission comprises at least one previously negatively acknowledged packet, or a combination of at least one previously acknowledged packet and at least one previously negatively acknowledged packet.

3. The method according to claim 1, further comprising, based on a determination that an at least one previously negatively acknowledged packet comprised in the received retransmitted packet was successfully decoded, decoding stored previously partially decoded retransmitted packets using the successfully received packet(s) of the received retransmitted packet.

4. The method according to claim 3, further comprising, based on a determination that a stored previously partially decoded retransmitted packet was successfully decoded using the successfully decoded packet(s) of the received retransmitted packet, decoding anew stored previously partially decoded retransmitted packets using the most recently successfully decoded packet.

5. The method according to claim 1, wherein for a first retransmission of the packet there is no stored partially decoded retransmitted packet, and after the first retransmission of the packet there are at least one stored partially decoded retransmitted packets.

6. A wireless receiving device configured to receive a retransmission of a packet from a transmitting device following a broadcast transmission of a plurality of packets from the transmitting device, wherein packets successfully decoded during the broadcast transmission have been acknowledged by the wireless receiving device to the transmitting device and stored in a memory associated with the receiving device and unsuccessfully decoded packets have been negatively acknowledged by the wireless receiving device to the transmitting device, the wireless receiving device comprising:
  a processor; and
  a memory, the memory comprising instructions which when executed by the processor causes the wireless receiving device to:
    receive the retransmission of the packet from the transmitting device;
    send, to the transmitting device, an acknowledge, ACK, message with respect to the received retransmitted packet;
    decode the received retransmitted packet using the stored previously successfully decoded packets;
    based on a determination that the received retransmitted packet is successfully decoded, decode stored previously partially decoded retransmitted packets if any using the successfully decoded packet, and store the successfully decoded packet; and
    based on a determination that the received retransmitted packet was only partially successfully decoded, store the partially decoded retransmitted packet.

7. The wireless receiving device according to claim 6, wherein the received packet by the retransmission comprises at least one previously negatively acknowledged packet, or a combination of at least one previously acknowledged packet and at least one previously negatively acknowledged packet.

8. The wireless receiving device according to claim 6, wherein the memory further comprises instructions which when executed by the processor causes the wireless receiving device to, based on a determination that an at least one previously negatively acknowledged packet comprised in the received retransmitted packet was successfully decoded, decode stored previously partially decoded retransmitted packets using the successfully decoded packet(s) of the received retransmitted packet.

9. The wireless receiving device according to claim 8, wherein the memory further comprises instructions which when executed by the processor causes the wireless receiving device to, based on a determination that a stored previously partially decoded retransmitted packet was successfully decoded using the successfully decoded packet(s) of the received retransmitted packet, decode anew stored previously partially decoded retransmitted packets using the most recently successfully decoded packet.

10. The wireless receiving device according to claim 6, wherein for a first retransmission of the packet there is no stored partially decoded retransmitted packet, and after the first retransmission of the packet there are at least one stored partially decoded retransmitted packets.

11. A non-transitory computer readable medium containing a computer program, which when run in a processing unit comprised in an arrangement in a wireless receiving device causes the wireless receiving device (1) to receive a retransmission of a packet from a transmitting device following a broadcast transmission of a plurality of packets from the transmitting device, wherein packets successfully decoded during the broadcast transmission have been acknowledged by the wireless receiving device to the transmitting device and stored in a memory associated with the wireless receiving device and unsuccessfully decoded packets have been negatively acknowledged by the wireless receiving device to the transmitting device, and (2) to perform a method comprising:
  receiving the retransmission of the packet from the transmitting device;
  sending, to the transmitting device, an acknowledge, ACK, message with respect to the received retransmitted packet;
  decoding the received retransmitted packet using the stored previously successfully decoded packets;
  based on a determination that the received retransmitted packet was successfully decoded, decoding stored previously partially decoded retransmitted packets if any using the successfully decoded packet, and storing the successfully decoded packet; and,
  based on a determination that the received retransmitted packet was only partially successfully decoded, storing the partially decoded retransmitted packet.

12. The non-transitory computer readable medium according to claim 11, wherein the method further comprising: based on a determination that an at least one previously negatively acknowledged packet comprised in the received retransmitted packet was successfully decoded, decoding stored previously partially decoded retransmitted packets using the successfully received packet(s) of the received retransmitted packet.

13. The non-transitory computer readable medium according to claim 12, wherein the method further comprising: based on a determination that a stored previously partially decoded retransmitted packet was successfully decoded using the successfully decoded packet(s) of the received retransmitted packet, decoding anew stored previously partially decoded retransmitted packets using the most recently successfully decoded packet.

14. The non-transitory computer readable medium according to claim 11, wherein the method further comprising: wherein for a first retransmission of the packet there is no stored partially decoded retransmitted packet, and after the first retransmission of the packet there are at least one stored partially decoded retransmitted packets.

* * * * *